(12) United States Patent
Zhang et al.

(10) Patent No.: US 10,318,824 B2
(45) Date of Patent: Jun. 11, 2019

(54) ALGORITHM TO EXTEND DETECTING RANGE FOR AVM STOP LINE DETECTION

(71) Applicant: GM GLOBAL TECHNOLOGY OPERATIONS LLC, Detroit, MI (US)

(72) Inventors: Wende Zhang, Troy, MI (US); Zhencheng Hu, Kumamoto (JP)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 377 days.

(21) Appl. No.: 14/803,894

(22) Filed: Jul. 20, 2015

(65) Prior Publication Data

US 2016/0026878 A1 Jan. 28, 2016

Related U.S. Application Data

(60) Provisional application No. 62/027,953, filed on Jul. 23, 2014.

(51) Int. Cl.
*G06K 9/00* (2006.01)
*B60R 1/00* (2006.01)
*H04N 7/18* (2006.01)
*G06K 9/46* (2006.01)

(52) U.S. Cl.
CPC .......... *G06K 9/00798* (2013.01); *B60R 1/00* (2013.01); *G06K 9/0051* (2013.01); *G06K 9/4609* (2013.01); *G06K 9/4633* (2013.01); *H04N 7/181* (2013.01); *B60R 2300/8086* (2013.01)

(58) Field of Classification Search
CPC ............ G06K 9/00798; G06K 9/4633; G06K 9/0051; G06K 9/4609; G06K 9/00; G06K 9/46; H04N 7/181; H04N 7/18; B60R 1/00; B60R 2300/607; B60R 2300/8086
USPC .......................................................... 348/148
See application file for complete search history.

(56) References Cited

U.S. PATENT DOCUMENTS

| | | | | |
|---|---|---|---|---|
| 2003/0197660 A1* | 10/2003 | Takahashi | .......... | G06K 9/00791 345/7 |
| 2004/0105579 A1* | 6/2004 | Ishii | .......... | B60R 1/00 382/154 |
| 2005/0111700 A1* | 5/2005 | O'Boyle | .......... | G06K 9/00201 382/104 |
| 2005/0276448 A1* | 12/2005 | Pryor | .......... | B60K 35/00 382/103 |
| 2007/0057816 A1* | 3/2007 | Sakakibara | .......... | B62D 15/0275 340/932.2 |
| 2010/0253540 A1* | 10/2010 | Seder | .......... | B60R 1/00 345/7 |
| 2011/0102553 A1* | 5/2011 | Corcoran | .......... | G06K 9/00281 348/50 |
| 2011/0249153 A1* | 10/2011 | Hirooka | .......... | B60R 1/00 348/241 |
| 2013/0250125 A1* | 9/2013 | Garrow | .......... | H04N 5/3658 348/164 |

\* cited by examiner

*Primary Examiner* — Patricia I Young
(74) *Attorney, Agent, or Firm* — Cantor Colburn LLP

(57) ABSTRACT

A system and method on a vehicle for providing extended detection range of a stop line on a roadway. The system and method includes a front view camera on the vehicle that provides images of the roadway in front of the vehicle and a controller that receives images from the front view camera. The controller is programmed to extract an upper portion of a front view image that is remapped onto an extended bird's eye view image such that the detection range of the stop line is detected.

13 Claims, 6 Drawing Sheets

ALGORITHM TO EXTEND DETECTING RANGE FOR AVM STOP LINE DETECTION

CROSS-REFERENCE TO RELATED APPLICATIONS

This application claims the benefit of the priority date of U.S. Provisional Patent Application Ser. No. 62/027,953, entitled, "Algorithm to Extend Detecting Range for AVM Stop Line Detection," filed Jul. 23, 2014.

BACKGROUND OF THE INVENTION

Field of the Invention

This invention relates generally to extended stop line detection range in a vehicle and, more particularly, to a system and method for extracting an upper portion of a front view image and remapping the upper portion of the image to an extended bird's eye view image.

Discussion of the Related Art

Modern vehicles are becoming more autonomous, that is, modern vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but will also automatically slow the vehicle down in the event that a slower moving vehicle is detected in front of the subject vehicle by using various sensors such as radar and cameras. Modern vehicle control systems may also include autonomous parking where the vehicle will automatically provide the steering control for parking the vehicle, and where the vehicle will stop or alert a driver to stop if a stop line in a roadway is detected.

Stop line detection and lane marker detection in autonomous and partially autonomous vehicles is known in the art. A stop line is a solid white line on a roadway that indicates a location where a vehicle traveling along the roadway is expected to stop. In the United States, these solid white stop lines have a width of approximately 12 to 24 inches. In Japan the width is approximately 0.3 to 0.45 meters, and in China the width of the stop line is approximately 0.2 to 0.4 meters. In all countries the stop lines are perpendicular to lane marker lines. When using known stop detection systems, these systems may be unreliable because dirt, tire polish and unclear stop line markers may pose a problem. For example, known edge detectors such as Sobel and Canny edge detection may be inaccurate when detecting a line candidate against dirt, illumination variation and other noise, thereby posing a safety risk. Additionally, known algorithms are complicated, with or without associated lane markers. Thus, there is a need in the art for a fast and robust stop line detection system that reduces processing time and increases vehicle safety. Furthermore, there is a need in the art for extended detection distance for stop line detection and tracking to further increase vehicle safety.

SUMMARY OF THE INVENTION

In accordance with the teachings of the present invention, a system and method on a vehicle are disclosed for providing extended detection range of a stop line on a roadway. The system and method includes a front view camera on the vehicle that provides images of the roadway in front of the vehicle and a controller that receives images from the front view camera. The controller is programmed to extract an upper portion of a front view image that is remapped onto an extended bird's eye view image such that the detection range of the stop line is detected.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for fast and robust stop line detection is merely exemplary in nature, and is in no way intended to limit the invention or its applications or uses. For example, the present invention has application for detecting any line or lane marker on a surface.

Figure 1:
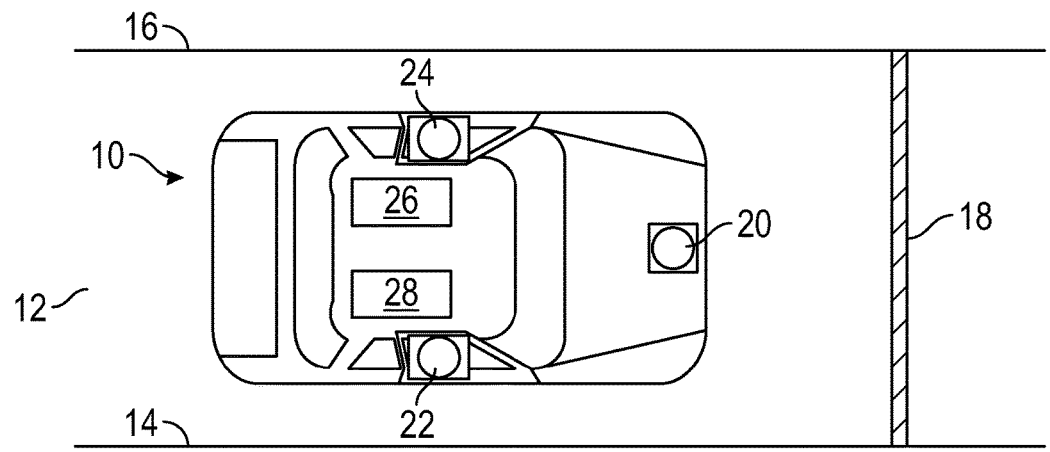
FIG. 1 is an illustration of a top down view of a vehicle on a roadway in front of a stop line, the vehicle including a surround view camera system having multiple cameras.

FIG. 1 is an illustration of a top down view of a vehicle 10 traveling along a roadway lane 12 that is defined by lane markers painted or otherwise affixed on the roadway lane 12 including an outside lane boundary line 14 and an inside lane center line 16. A stop line 18 is on the roadway lane 12 that indicates a location where the vehicle 10 is expected to stop. The stop line 18 is defined by a line that is painted or otherwise fixed on the roadway lane 12.

The vehicle 10 includes a surround view monitoring system having a front view camera 20, a right-side view camera 22 and a left-side view camera 24. A rear camera may also be included in the around view monitoring system, although not shown for the sake of clarity. The cameras 20-24 may be any camera suitable for the purposes described herein, many of which are known in the automotive art, that are capable of receiving light, or other radiation, and converting the light energy to electrical signals in a pixel format using, for example, charged couple devices (CCD). The cameras 20-24 generate frames of image data at a certain data frame rate that can be stored for subsequent processing. The cameras 20-24 may be mounted within or on any suitable structure that is part of the vehicle 10, such as bumpers, facie, grills, side-view mirrors, door panels, etc., as would be well understood and appreciated by those skilled in the art. Image data from the cameras 20-24 is sent to a processor 26 that processes the image data to generate images, including bird's eye view images, that are displayed on a vehicle display 28.

Known edge detectors such as Sobel and Canny edge detection may be inaccurate when detecting a line candidate against dirt, illumination variation and other noise. A line filter algorithm of the controller 26, described in detail below, is robust in detecting the stop line 18 in the presence of dirt, varying illumination conditions and unclear markers. Using the cameras 20-24, and the line filter algorithm of the controller 26 described herein, a composite view, described in detail below, is able to simultaneously extract the stop line 18 (i.e., the horizontal line) and the lane markers 14 and 16 (i.e., the vertical lines) in a manner that is both fast and robust. The line filter algorithm described herein may simply use a single camera, such as the front camera 20, to detect the stop line 18 as well.

By assuming that the vehicle 10 is driving along the roadway lane 12, a set of parallel vertical lane markers that correspond to the lines 14 and 16 and one perpendicular line that corresponds to the stop line 18 are detected using a modified Hough transformation. The line filter algorithm of the controller 26 makes full use of the feature of a white painted roadway line, such as parking lines, lane markers and/or stop lines, as the white painted lines are brighter than their neighborhood. A convolution kernel with 1×(2n+1) elements are used by the line filter algorithm as shown in Table 1:

TABLE 1

| -1 | ⋯ | -1 | -1 | 0 | 1 | 1 | ⋯ | -1 |

$\underbrace{\phantom{xxxxxxxxx}}_{n}$  $\underbrace{\phantom{xxxxxxxxx}}_{n}$

Figure 2:
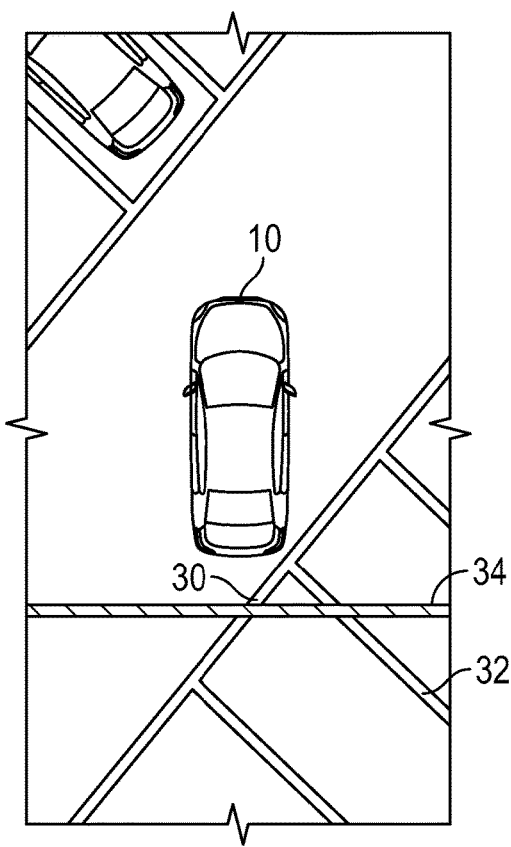
FIG. 2 is an illustration of a top down view of a vehicle near parking lines.

FIG. 2 illustrates a vehicle 36 near white painted lines 30 and 32. A detection line 34 is an exemplary line of detection for the line filtering algorithm that intersects the white painted lines 30 and 32 where the line filter algorithm of the controller 26 determines the presence of a line using the following equation:

$$H(x, y) = \frac{1}{n}\sum_{i=0}^{n} (L(x+i, y) - L(x-i, y)), \quad (1)$$

where H(x,y) is the horizontal line filtering result on pixel (x,y), L is the pixel value of the target image, i.e., the brightness, x is the x-axis coordinate and y is the y-axis coordinate.

Figure 3:
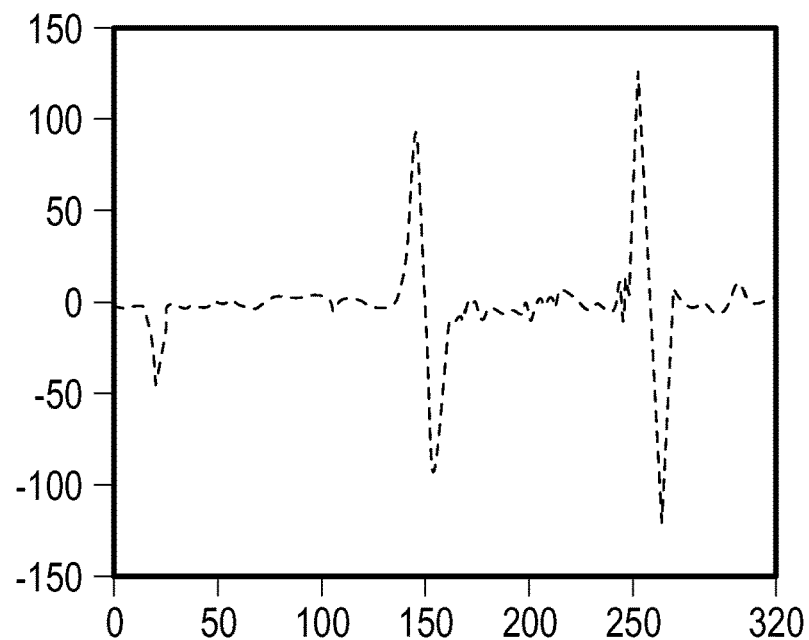
FIG. 3 is a graph with x-coordinate pixel values on the x-axis and a horizontal line filtering result on the y-axis.

FIG. 3 is a graph with x-coordinate pixel values on the x-axis and the horizontal line filtering result on the y-axis, where 420 represents an arbitrary number of pixel lines in the vertical direction. The example graph shown in FIG. 3 corresponds to the line filter result of the exemplary detection line 34 in FIG. 2 using equation (1). While the line filtering algorithm detects all or substantially all pixels in an image, such as the image of FIG. 2, the detection line 34 is the line of interest in this example that is represented by the graph of FIG. 3. A first pair that consists of a positive and a negative peak in the graph corresponds to the portion of the white painted line 30 that intersects the detection line 34 shown in FIG. 2. A second pair that consists of a positive peak and a negative peak in the graph corresponds to the white painted line 32 that intersects the detection line 34 as shown in FIG. 2. While a small negative peak can be seen in the graph of FIG. 3, this corresponds to an illumination change in the roadway pavement, such as a shadow, that is in the image near the left side of the detection line 34 (shadow not shown in FIG. 3 for the sake of clarity). Because this negative peak is small and is not preceded by a positive peak, i.e., the algorithm does not detect a pair that consists of a positive and a negative peak, the algorithm recognizes that this does not indicate a white painted line because of the lack of a positive peak. It is the positive peak to negative peak difference in a given pair that consists of a positive and a negative peak that indicates a white painted line. Thus, using the line filter algorithm of the controller 26 that utilizes the line filter kernel shown in Table 1 and that uses equation (1), a fast and robust white painted line detection algorithm is achieved that produces convolution results such that all the white lines in the images processed by the controller 26 will have paired positive and negative peaks in the results, as shown in the example of FIGS. 2 and 3.

Because stop line detection requires the extraction of both horizontal (stop line) lines and also vertical (lane marker) lines, the line filtering discussed above must be filtered vertically using the following equation to detect a stop line:

$$V(x, y) = \frac{1}{n}\sum_{j=0}^{n} (L(x+i, j) - L(x-i, j)), \quad (2)$$

where V(x,y) is the vertical line filtering result on pixel (x,y).

Typical convolution calculations in the vertical direction are much more time consuming than convolution calculations in the horizontal direction because calculations in the horizontal direction can employ single instruction multiple data (SIMD), which speeds up processing. To speed up calculations of the vertical lane markers 14 and 16 and the horizontal stop line 18 described herein, an algorithm of the controller 26 rotates an original bird's eye view image 90° in a clockwise or a counterclockwise direction and pastes the rotated image with the original image to create a composite bird's eye view image.

Figure 4:
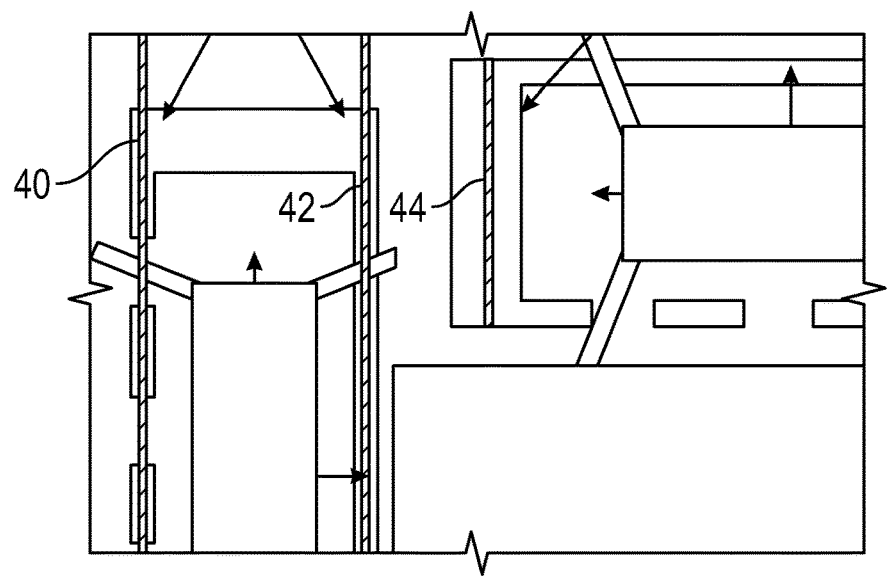
FIG. 4 is an illustration of a top down view of a composite bird's eye view image.

FIG. 4 illustrates a top down view of a composite image that includes an original bird's eye image with extracted vertical lines 40 and 42 that correspond to lane markers, and a rotated bird's eye view image with an extracted vertical line 44 that corresponds to a stop line of the image. By creating the composite image that includes the original bird's eye view and the rotated bird's eye view, the line filter algorithm of the controller 26 is able to carry out only horizontal line filtering such that the determined paired peaks (i.e., a positive peak followed by a negative peak) are extracted with a width limitation from peak-to-peak of the paired peaks that corresponds to the width of lane markers and stop lines. In this way, an optimized parallel processing approach is used to quickly and robustly filter out and determine both lane markers and stop lines in an efficient manner.

Using the line filter discussed above, a horizontal line filter may be used to detect vertical lines by rotating and pasting an image such that vertical lines are horizontal. Also, as described above, a vertical line filter may be used to detect horizontal white lines by rotating and pasting an image such that horizontal lines are vertical. Finally, a diagonal line filter is able to detect the perpendicular white lines by rotating an image 45° and pasting the image to create a composite image as discussed above. For example, if the line filter algorithm is used in the horizontal direction, i.e., using the Equation (1), vertical roadway lines may also be detected because the image of interest is rotated 90°. Alternatively, horizontal roadway lines may be detected using the Equation (2) by rotating an image that includes vertical lines 90° and pasting the image to create a composite image as discussed above. To detect diagonal lines, an image may be rotated 45°, for example, and the line filter algorithm may utilize a convolution matrix where diagonal elements are {−1, −1, . . . , 0, 1, 1, . . . , 1}. The result of this line filtering process is the same, a pair that includes a positive and a negative peak that corresponds to the width of a white line (if white painted roadway lines are present in the image being analyzed by the line filter algorithm). Alternatively, dark lines may be detected by the line filter algorithm, which would be indicated by a pair that includes a negative peak followed by a positive peak.

Post processing is performed to investigate vertical connectivity. Any candidate points will be removed if the algorithm cannot find a nearby vertical neighbor within certain rows. For example, if point (x, y) is a candidate white line point on an image, the vertical connectivity check is to check if its neighbor pixels, e.g., (x, y−1), (x, y+1), (x−1, y−1), (x−1, y+1), (x+1, y−1), (x+1, y+1) and (x, y−2), (x, y+2) are candidate points also. If the neighbor points such as those described above are not candidate points, the candidate point (x, y) will be removed because of the lack of vertical connectivity.

The final line extraction may include a Hough transformation algorithm that is limited to the extraction angle +/−20 degrees and with the assumption that the vehicle is driving along a roadway lane.

Figure 5:
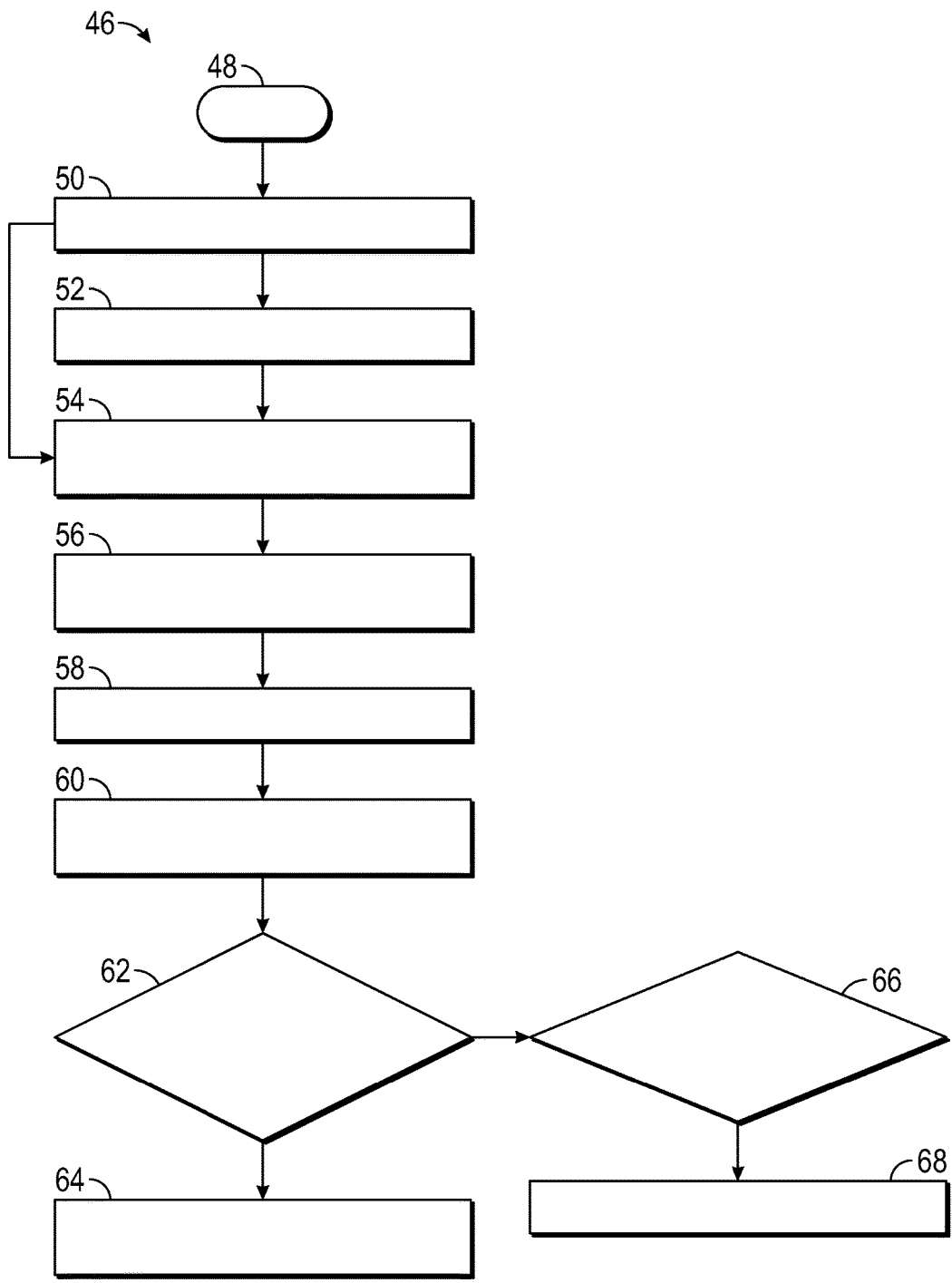
FIG. 5 is a flow chart diagram of an algorithm that quickly and robustly detects stop lines.

FIG. 5 is a flow chart diagram 46 of an algorithm that quickly and robustly detects stop lines. The algorithm begins at box 48 and builds a bird's eye view image as described above at box 50. The bird's eye view image result is rotated in a desired manner at box 52, and a composite image is created that includes an original bird's eye view image and a rotated bird's eye view image as described in detail above at box 54. The horizontal line filter described above is processed such that candidate points in the composite image are extracted at box 56, and a vertical connectivity check is performed at box 58. A modified Hough transformation algorithm is used to extract only vertical lines, for example, at box 60, and the algorithm uses the extracted result to determine if line candidates are detected in both the original bird's eye view image and the rotated bird's eye view image of the composite image at decision diamond 62. If yes, both stop line and road lane markers are outputted at box 64. If no, the algorithm determines if line candidates are detected in the rotated bird's eye view image only at decision diamond 66. If yes, only a stop line is outputted at box 68. If no, nothing is outputted.

Using the around view monitoring system as described above has certain drawbacks. For example, the around view monitoring system may have limited stop line detection distance because the installation position of the front view camera 20 is very low and also because the bird's eye view in the vehicle front area will be blurred over a certain distance. Because detection distance is determined by camera position, lens features and other factors, the general detection distance for stop lines will be shorter than approximately 6 meters. This distance is too short for an autonomous vehicle to stop or warn a driver to stop. To overcome this problem, the controller 26 includes a projection algorithm that projects an upper part of an original front view image onto an extended bird's eye view in a manner described in detail below.

Figure 6:
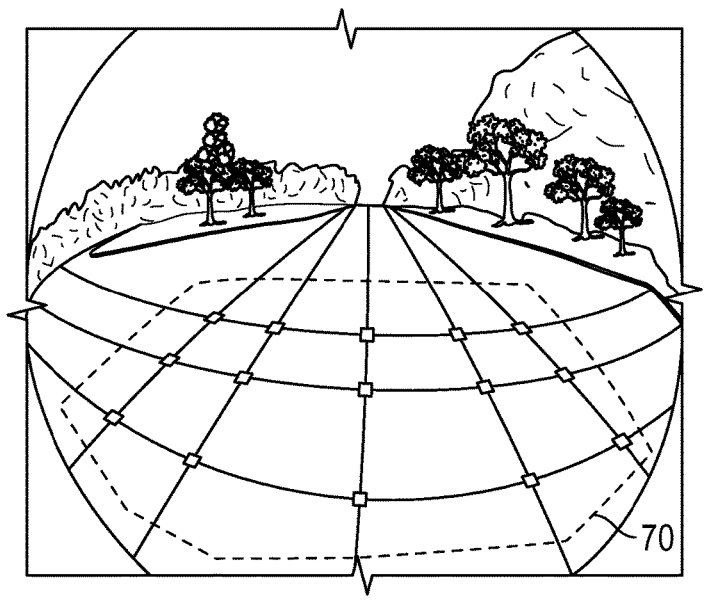
FIG. 6 is an illustration of a front view image from a front view camera of the vehicle.
Figure 7:
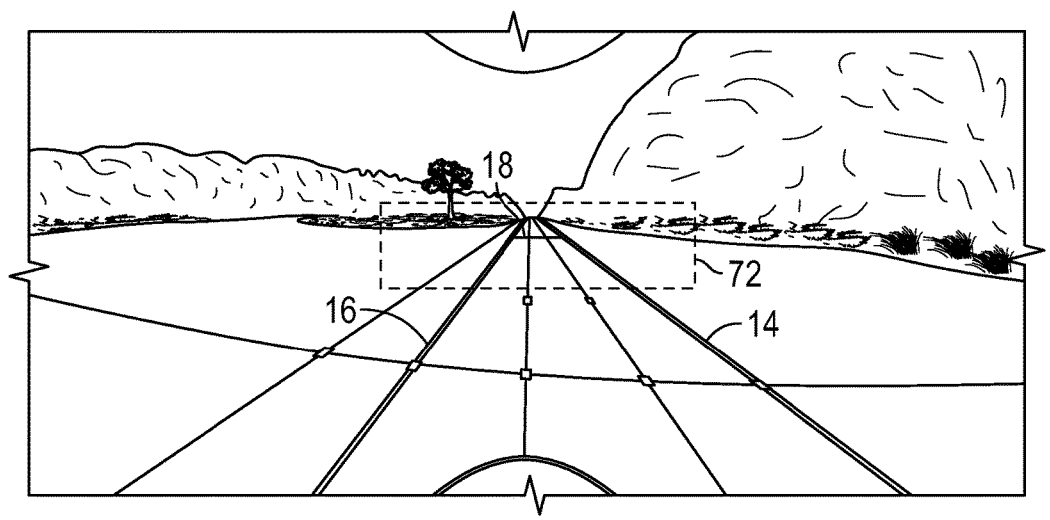
FIG. 7 is an illustration of an undistorted front view image from the front view camera.
Figure 8:
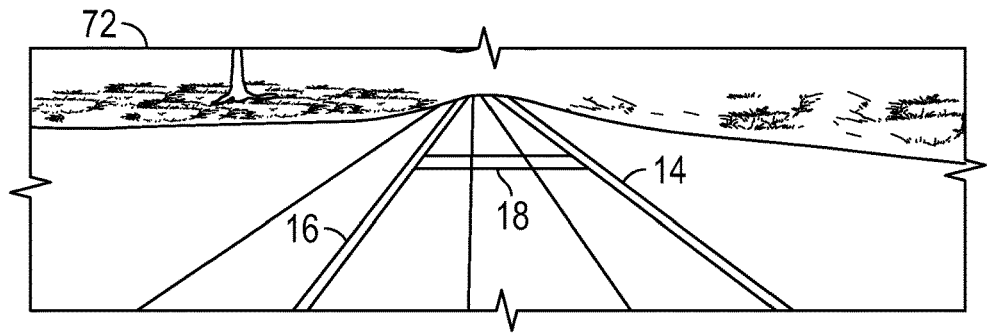
FIG. 8 is an illustration of an extracted front view image from the undistorted front view.

FIG. 6 illustrates a front view image from the front view camera 20 of the vehicle 10. Typically, only part of the front view image may be viewed in a bird's eye view. A dashed hexagonal shape 70 indicates the region of the front view image that is typically seen in a bird's eye view image. To improve stop line detection distance, the projection algorithm of the controller 26 utilizes the upper part of the undistorted front view image data to build an extended stop line detection area. FIG. 7 is an illustration of an undistorted front view image from the front view camera 20, where a dashed box 72 is the upper part of the image that is used to build an extended detection area. FIG. 8 is a view of the image extracted from the box 72.

Figure 9:
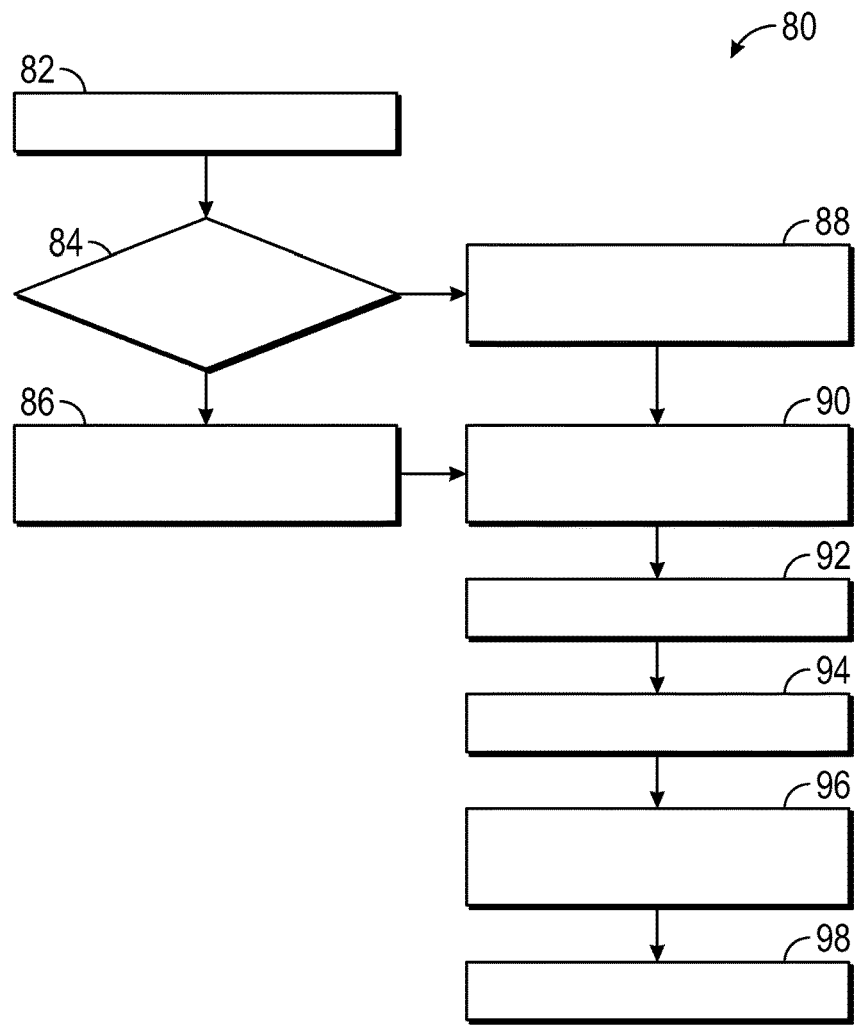
FIG. 9 is a flow chart diagram of an algorithm that provides extended distance stop line detection.

FIG. 9 is a flow chart diagram 80 of an algorithm of the controller 26 that provides extended distance stop line detection. The algorithm begins at box 82. Next, the algorithm determines if the lane markers 14 and 16 are successfully detected in the bird's eye view at decision diamond 84. If the lane markers 14 and 16 are successfully detected, the average intensity of pixels on the lane markers 14 and 16 are calculated as a reference value for upper lane marker extraction at box 86. If the lane markers 14 and 16 are not detected, a predetermined safe value, $T_w$, is selected to act as an upper lane marker extraction threshold at box 88. $T_w=1.2\times I_{max}$, where $I_{max}$ is the peak value of the AVM bird's eye intensity histogram, which corresponds to road surface intensity.

Next, an upper region of the front view image from the front view camera 20 is extracted for a stop line candidate determination at box 90. The determination uses white line pixels via a simple binarization method, where the threshold is the average intensity of extracted lane markers or a predetermined safe value as described above. All extracted white line pixels are remapped to a bird's eye view according to a camera calibration lookup table (LUT) at box 92, as is known to those skilled in the art.

Figure 10:
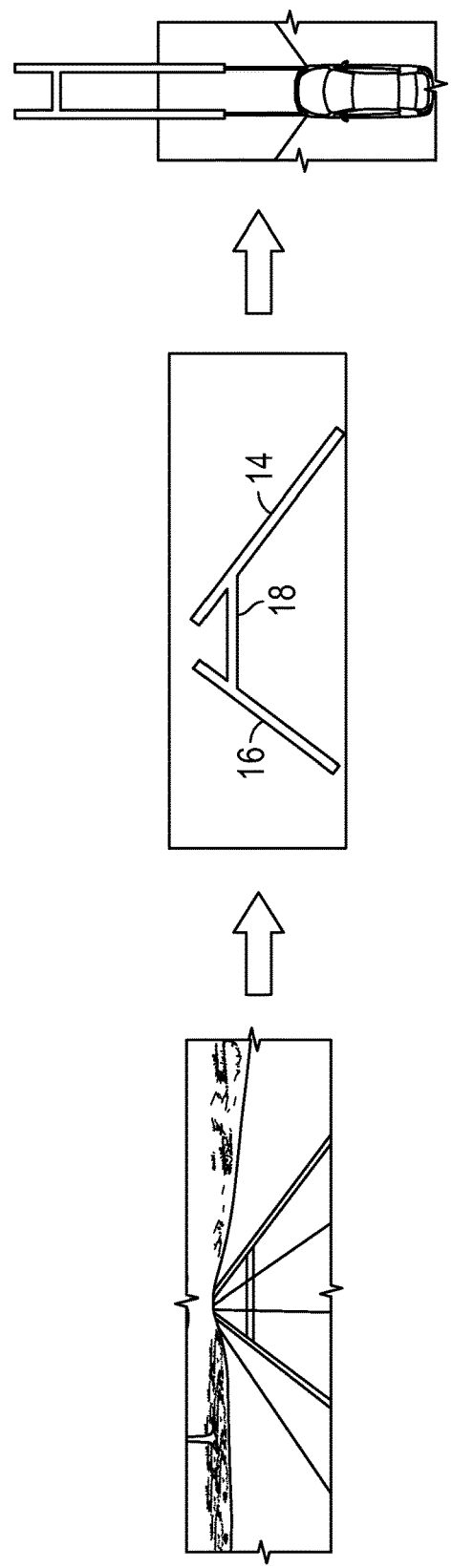
FIG. 10 is an illustration of a generalization of an algorithm for extracting an upper region of a front view image.

FIG. 10 is an illustration of a generalization of how the projection algorithm extracts the upper region at the box 90. Box 102 is the extracted upper region of the front view image as shown in FIG. 8. At box 104 lane markers are detected. At box 106 the extracted white line pixels are remapped to the bird's eye view according to the camera calibration LUT. The projection algorithm also detects an extracted peak at box 94 using a moving average filter. For example, for every N rows profile values are added to smooth the output.

Further, the algorithm of the controller 26 tracks a stop line candidate position and movement of the current frame in the following images at box 96. The probability of the existence of a stop line increases as tracking continues. The information regarding the tracked stop line is provided to the algorithm for detecting a stop line as described in the flow chart of FIG. 5 at box 98 to predict the position of the tracked stop line.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system on a vehicle that provides extended detection range of a stop line on a roadway, said system comprising:
   a front view camera on the vehicle that provides a front view image of the roadway in front of the vehicle; and
   a controller that is programmed to:
   receive the front view image from the front view camera;
   map a region of the front view image into an original bird's eye view;
   detect lane markers in the original bird's eye view;
   calculate a pixel intensity reference value from the detected lane markers;
   extract an upper region of the front view image;
   extract white line pixels from the upper region using the pixel intensity reference value;
   remap the white line pixels onto an extended bird's eye view according to a camera calibration look up table;
   determine a position of a stop line candidate using the white line pixels via a binarization method; and
   track the position of the stop line candidate in the extended bird's eye view in subsequent extracted images.

2. The system according to claim 1 further comprising using a predetermined safe value as the reference value if the land markers are not detected in the images from the front view camera.

3. The system according to claim 1 wherein a position of the stop line is predicted using the stop line candidate position that is tracked in the following extracted images.

4. The system according to claim 1 wherein the controller is further programmed to detect an extracted peak from the extracted upper portion of the front view image that corresponds to the stop line.

5. The system according to claim 1 wherein the controller is further programmed to detect an extracted peak from the extracted upper portion of the images using a moving average filter.

6. A system on a vehicle that provides extended detection range of a stop line on a roadway, said system comprising:
   a front view camera on the vehicle, said front view camera being capable of providing a front view image of the roadway in front of the vehicle; and
   a controller that is programmed to:
   receive the front view image from the front view camera;
   map a region of the front view image into an original bird's eye view;
   detect lane markers in the original bird's eye view;
   calculate a pixel intensity reference value from the detected lane markers;
   extract an upper region of the front view image;
   extract white line pixels from the upper region using the pixel intensity reference value;
   remap the white line pixels onto an extended bird's eye view according to a camera calibration look up table;
   determine a position of a stop line candidate using the white line pixels via a binarization method; and
   track the position of the stop line candidate in the extended bird's eye view in subsequent extracted images.

7. The system according to claim 6 wherein a predetermined safe value is used as the reference value if lane markers are not detected in the images from the front view camera.

8. The system according to claim 6 wherein a position of the stop line is predicted using the stop line candidate position that is tracked in the following extracted images.

9. The system according to claim 6 wherein the controller is further programmed to detect an extracted peak from the extracted upper portion of the images using a moving average filter.

10. A method for providing extended detection range on a vehicle for a stop line on a roadway, said method comprising:
    providing a front view camera on the vehicle that provides a front view image of the roadway in front of the vehicle; and
    using a controller that is programmed to:
    receive the front view image from the front view camera;
    map a region of the front view image into an original bird's eye view;
    detect lane markers in the original bird's eye view;
    calculate a pixel intensity reference value from the detected lane markers;
    extract an upper region of the front view image;
    extract white line pixels from the upper region using the pixel intensity reference value;
    remap the white line pixels onto an extended bird's eye view according to a camera calibration look up table;
    determine a position of a stop line candidate using the white line pixels via a binarization method; and
    track the position of the stop line candidate in the extended bird's eye view in subsequent extracted images.

11. The method according to claim 10 further comprising using a predetermined safe value is used as the reference value if the lane markers are not detected in the images from the front view camera.

12. The method according to claim 10 wherein the controller is further programmed to detect an extracted peak from the extracted upper portion of the front view image that corresponds to the stop line.

13. The method according to claim 10 wherein the controller is further programmed to detect an extracted peak from the extracted upper portion of the images using a moving average filter.

* * * * *